United States Patent
Cudak et al.

(10) Patent No.: US 9,285,839 B1
(45) Date of Patent: Mar. 15, 2016

(54) SMART COVER FOR AN ELECTRONIC DEVICE

(71) Applicant: Lenovo Enterprise Solutions (Singapore) Pte. Ltd., Singapore (SG)

(72) Inventors: Gary D. Cudak, Wake Forest, NC (US); Christopher J. Hardee, Raleigh, NC (US); Sarbajit K. Rakshit, Kolkata (IN); Adam Roberts, Moncure, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 14/469,015

(22) Filed: Aug. 26, 2014

(51) Int. Cl.
| | |
|---|---|
| *G06F 17/00* | (2006.01) |
| *G06F 1/16* | (2006.01) |
| *G06F 3/041* | (2006.01) |
| *G06F 3/147* | (2006.01) |
| *G09G 5/00* | (2006.01) |

(52) U.S. Cl.
CPC ............ *G06F 1/1677* (2013.01); *G06F 3/0412* (2013.01); *G06F 3/0416* (2013.01); *G06F 3/147* (2013.01); *G09G 5/006* (2013.01); *G09G 2320/0606* (2013.01); *G09G 2320/08* (2013.01); *G09G 2354/00* (2013.01); *G09G 2370/22* (2013.01)

(58) Field of Classification Search
CPC ........................... H04M 1/0245; G06F 1/1677
USPC ................. 345/173; 235/375; 455/566, 575.8
See application file for complete search history.

(56) References Cited

U.S. PATENT DOCUMENTS

| | | | |
|---|---|---|---|
| 6,573,886 B1 * | 6/2003 | Lehtinen et al. | 345/173 |
| 2006/0284852 A1 | 12/2006 | Hofmeister et al. | |
| 2012/0068798 A1 | 3/2012 | Lauder et al. | |
| 2012/0308981 A1 | 12/2012 | Libin et al. | |

OTHER PUBLICATIONS

Apple, Inc., "Smart Case", Apple, Inc., Apple.Com, Retrieved May 15, 2014, pp. 1-7.

* cited by examiner

*Primary Examiner* — Jamara Franklin
(74) *Attorney, Agent, or Firm* — Law Office of Jim Boice

(57) ABSTRACT

A cover for an electronic device comprises: at least one sensor, wherein the at least one sensor detects the cover being partially opened; and a signal transmitter, wherein the signal transmitter: transmits, to a video controller in the electronic device, an opening signal in response to the cover being partially opened, wherein the opening signal is in response to the cover being partially opened, and wherein the opening signal identifies and enables a first portion of a display on the electronic device; and transmits, to the video controller in the electronic device, a disabling signal to disable a second portion of the display that is not identified by the opening signal.

19 Claims, 5 Drawing Sheets

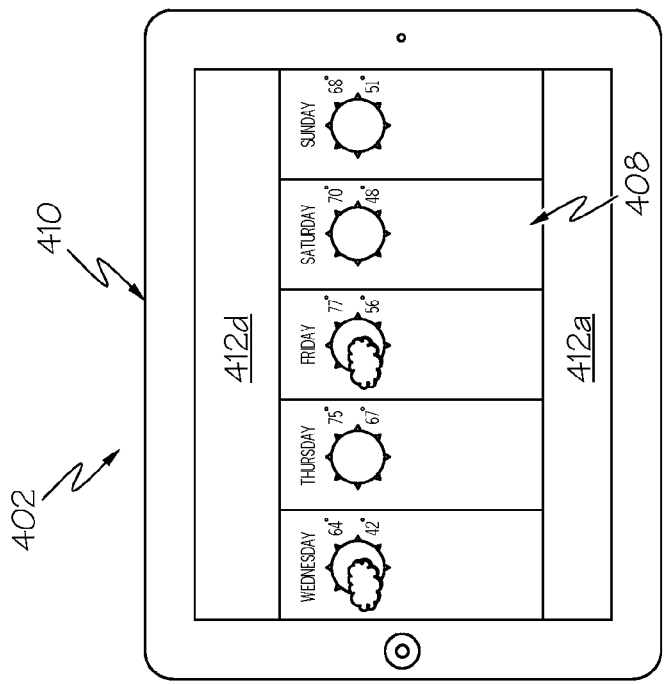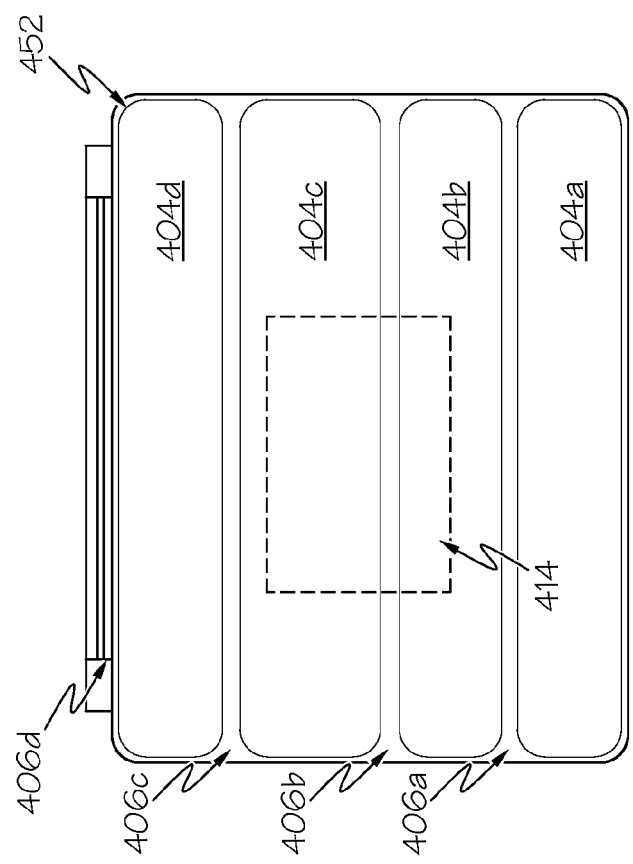
FIG. 4

SMART COVER FOR AN ELECTRONIC DEVICE

BACKGROUND

The present disclosure relates to the field of electronic devices, and specifically to electronic devices that are protected by covers. Still more particularly, the present disclosure relates to controlling a display on an electronic device that has a protective cover.

Many electronic devices are afforded physical protection by covers (cases), which cover the electronic devices, and which may be made of a soft material (e.g., cloth) or a hard material (e.g., hard plastic). Such covers provide protection from the elements, such as dust, water, etc. Similarly, these covers provide protection from physical blows to the electronic device. For example, a tablet computer may be protected by a case/cover that provides protection against breakage, scratches, etc. to a display on the tablet computer.

SUMMARY

In one embodiment of the present invention, a method and/or computer program product control a displayed area on an electronic device's display. A video controller in an electronic device receives an opening signal from a cover on the electronic device. The opening signal is in response to the cover being partially opened, and the opening signal identifies a first portion of a display, on the electronic device that is to be enabled. A second portion of the display that is not identified by the opening signal is electrically disabled.

In one embodiment of the present invention, a cover for an electronic device comprises: at least one sensor, wherein the at least one sensor detects the cover being partially opened; and a signal transmitter, wherein the signal transmitter: transmits, to a video controller in the electronic device, an opening signal in response to the cover being partially opened, wherein the opening signal is in response to the cover being partially opened, and wherein the opening signal identifies and enables a first portion of a display on the electronic device; and transmits, to the video controller in the electronic device, a disabling signal to electrically disable a second portion of the display that is not identified by the opening signal.

BRIEF DESCRIPTION OF THE SEVERAL VIEWS OF THE DRAWINGS

FIG. 4 illustrates a display that is partially disabled according to a user's tactile input to the cover shown in FIG. 2*a*.

DETAILED DESCRIPTION

Figure 1:
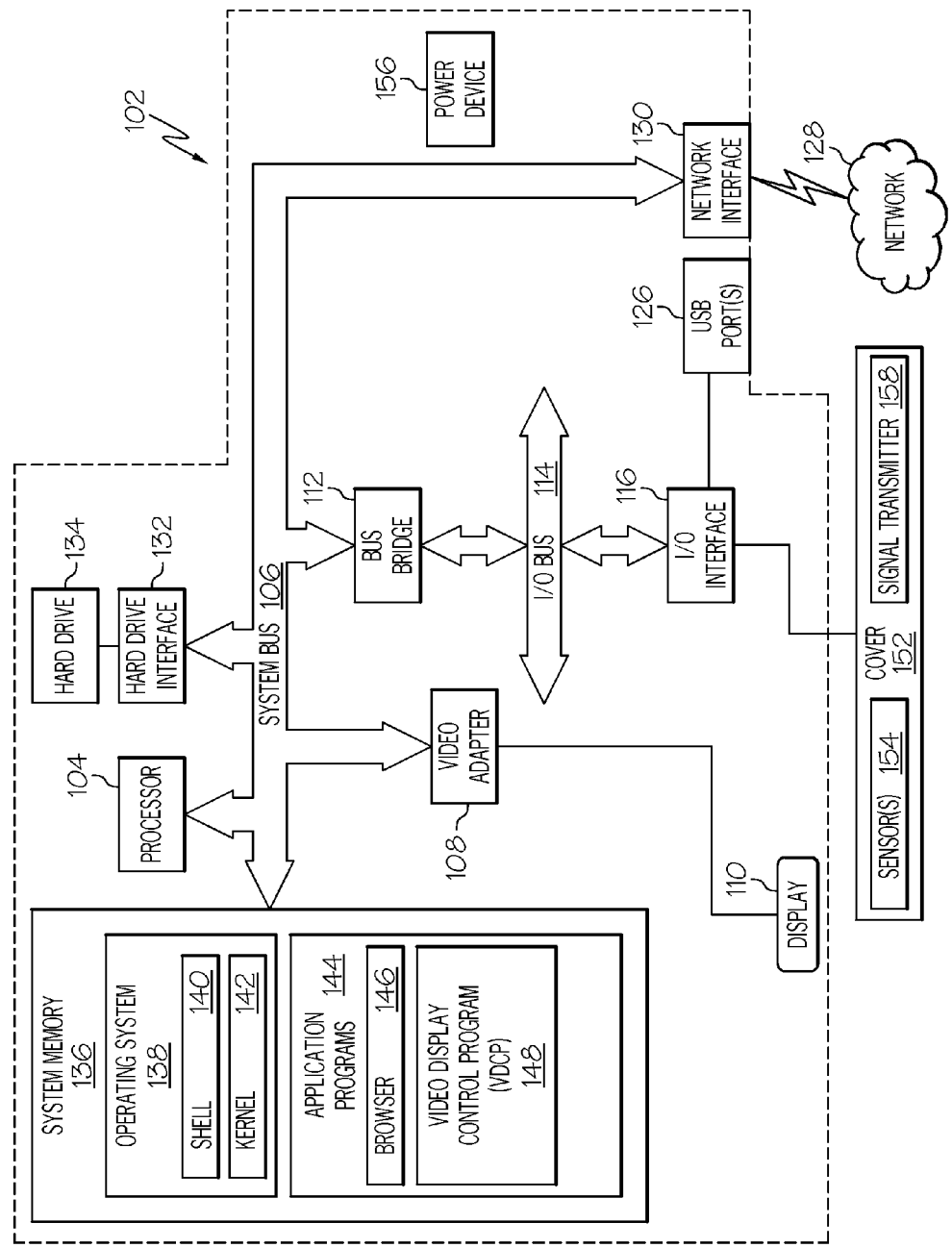
FIG. 1 depicts an exemplary system and network in which the present disclosure may be implemented.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular to FIG. 1, there is depicted a block diagram of an exemplary system and network that may be utilized by and/or in the implementation of the present invention.

Exemplary electronic device 102, includes a processor 104 that is coupled to a system bus 106. Processor 104 may utilize one or more processors, each of which has one or more processor cores. A video controller 108, which drives/supports a display 110, is also coupled to system bus 106. System bus 106 is coupled via a bus bridge 112 to an input/output (I/O) bus 114. An I/O interface 116 is coupled to I/O bus 114. I/O interface 116 affords communication with various I/O devices, including external USB port(s) 126.

As depicted, electronic device 102 is able to communicate with other electronic devices and/or computers and/or servers using a network interface 130. Network interface 130 is a hardware network interface, such as a network interface card (NIC), etc. Network 128 may be an external network such as the Internet, or an internal network such as an Ethernet or a virtual private network (VPN), or a wireless local area network (WLAN).

A hard drive interface 132 is also coupled to system bus 106. Hard drive interface 132 interfaces with a hard drive 134. In one embodiment, hard drive 134 populates a system memory 136, which is also coupled to system bus 106. System memory is defined as a lowest level of volatile memory in electronic device 102. This volatile memory includes additional higher levels of volatile memory (not shown), including, but not limited to, cache memory, registers and buffers. Data that populates system memory 136 includes electronic device 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., electronic device 102) to send and receive network messages to the Internet using hypertext transfer protocol (HTTP) messaging, thus enabling communication with other computer systems.

Application programs 144 in electronic device 102's system memory also include a Video Display Control Program (VDCP) 148. VDCP 148 includes code for implementing the processes described below, including those described in FIGS. 2-5.

Note that in one or more embodiments of the present invention, power is provided to one or more of the components depicted in computer 102 from a power device 156. In various embodiments, power device 156 includes a transformer for lowering/raising incoming voltage (e.g., from a power source—not shown), a converter for converting incoming power from one format into another (i.e., converting alternating current into direct current), power storage devices for storing power (i.e., batteries, capacitors, etc.), etc.

Note further that a protective cover 152 is in electrical communication with I/O interface 116. This electrical connection affords electrical communication between sensor(s)

154 embedded in the protective case 152 and the computer 102, including the video controller 108 and/or VDCP 148, via the I/O interface 116, the I/O bus 114, and/or the system bus 106. Based on readings from sensor(s) 154, a signal transmitter 158 is able to transmit an opening signal to computer 102, indicating a degree to which the protective case is opened/closed. Cover 152 in FIG. 1 depicts components used by analogous covers 252, 352, and 452 depicted in respective FIGS. 2-4.

Note that electronic device electronic device 102 may be any device that has a display (e.g., display 110) and sufficient processing power (e.g., processor 104) to control the display. Thus, in various embodiments, electronic device 102 may be a tablet computer, a smart phone, a laptop computer, a Global Positioning System (GPS) navigation device, and/or any other electronic device (including a portable and/or battery-powered device) that has a visual display as described herein. Note further that some or all of the components depicted for electronic device 102 may be incorporated into one or more embodiments of electronic devices 202, 302, and/or 402 presented respectively in FIGS. 2-4.

Figure 2:
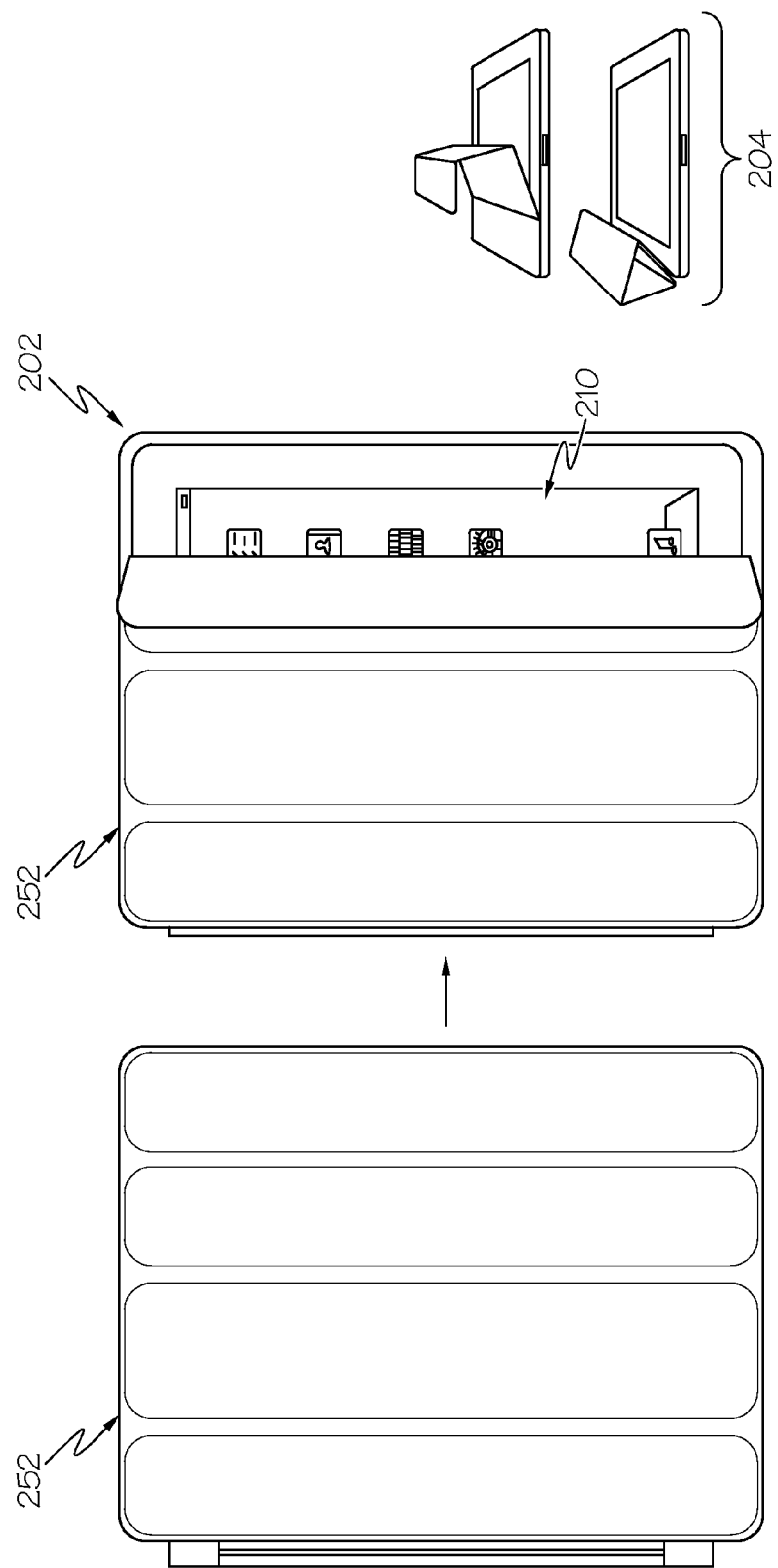
FIGS. 2*a*-2*b* illustrates an exemplary cover, for an electronic device having a display, being partially opened.
Figure 3:
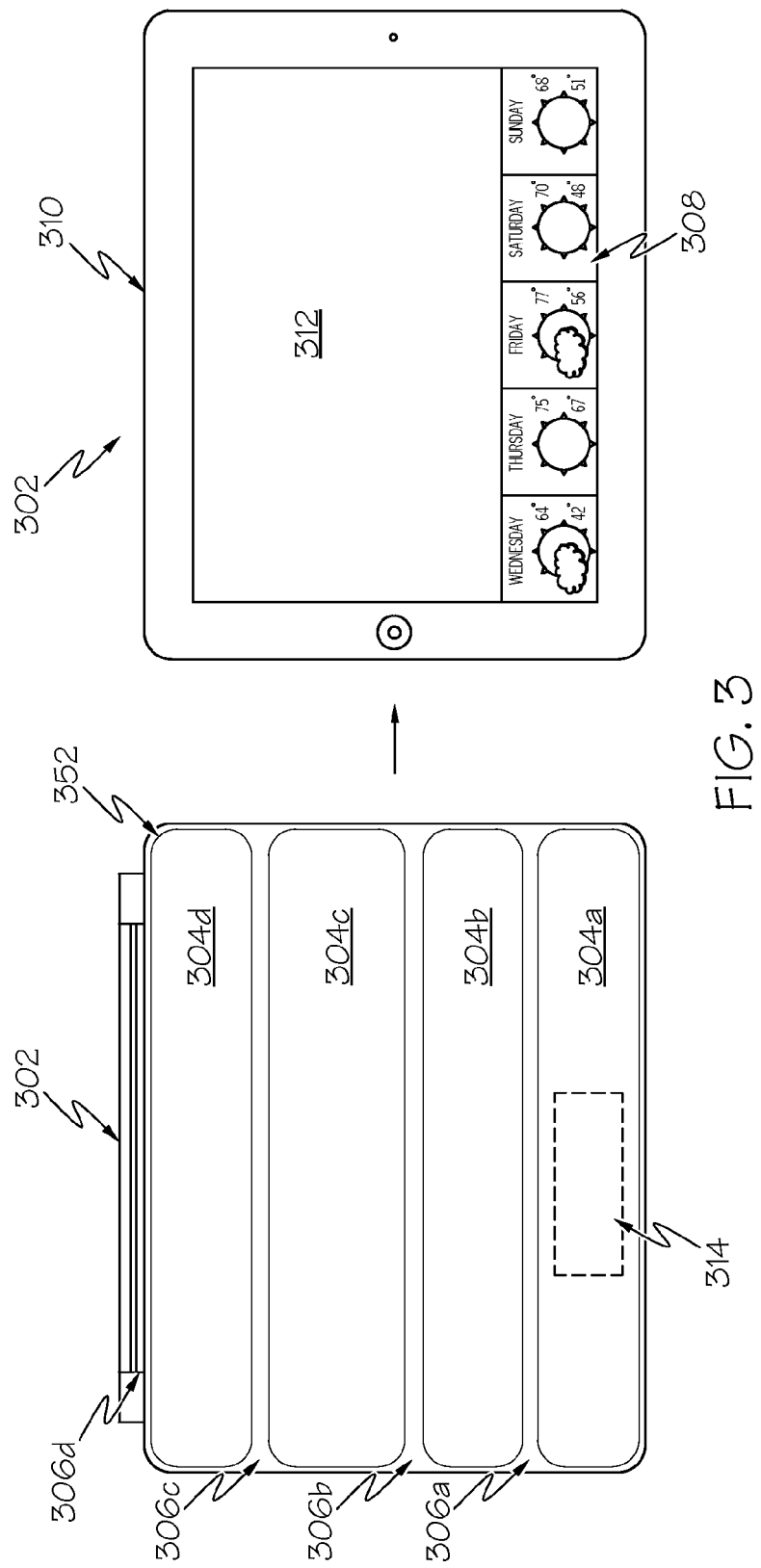
FIG. 3 depicts a display that is partially disabled according to a partial opening of the cover shown in FIG. 2*a;*

Similarly, some or all of the architecture presented for protective case 152 and components therein (sensor(s) 154 and signal transmitter 158) may be utilized by cases 252, 352, and/or 452 presented respectively in FIGS. 2-4.

Note further that the hardware elements depicted in electronic device 102 are not intended to be exhaustive, but rather are representative to highlight essential components required by the present invention. For instance, electronic device 102 may include alternate memory storage devices such as magnetic cassettes, digital versatile disks (DVDs), Bernoulli cartridges, and the like. These and other variations are intended to be within the spirit and scope of the present invention.

With reference now to FIG. 2a, an exemplary cover 252 (similar to the cover 152 shown in FIG. 1) for an electronic device 202 (similar to electronic device 102 in FIG. 1) having a display 210 (similar to display 110 in FIG. 1) is depicted being partially opened. In one embodiment and as depicted in FIG. 2a, electronic device 202 is a tablet computer. In other embodiments, electronic device 202 is a smart phone, a laptop computer, a Global Positioning System (GPS) navigation device, and/or any other electronic device (including a portable and/or battery-powered device) that has a visual display (e.g., display 210).

As depicted in FIG. 2b, in one embodiment of the present invention, the cover 252 is hinged, such that it unfolds in a sequential manner as shown in sequence 204. As the cover 252 is unfurled along the hinged sections, specific areas of the display 210 are uncovered/revealed to the user. In accordance with one or more embodiments of the present, the specific hinged sections that are unfurled and/or touched in a prescribed manner by the user define which sections of the display 210 are to be enabled and which are to be disabled.

The terms "enabled" and "disabled" are defined in various ways, according to alternative embodiments of the present invention. For example, in one embodiment of the present invention the terms "enabled" and "disabled" describe whether or not a section of the display is capable of displaying visual images. Thus, in this embodiment an enabled first portion of the display is visible to a user, and a disabled second portion of the display is not visible to the user.

In another embodiment of the present invention, in which the display is a touch screen (i.e., a screen that accepts inputs by tactile pressure against the screen itself), the terms "enabled" and "disabled" describe whether or not an area of the touch screen is able to accept tactile inputs, even though the entire screen is visually displayed. Thus, in this embodiment an enabled first portion of the display is capable of receiving tactile inputs from a user, and a disabled second portion of the display is not capable of receiving tactile inputs from the user.

Reference is now made to FIG. 3, which depicts a display that is partially disabled according to a partial opening of the cover shown in FIG. 2a. That is, assume that a cover 352 (similar to the cover 252 shown in FIG. 2a) on an electronic device 302 (analogous to electronic device 202 shown in FIG. 2a) has multiple cover sections 304a-304d (where "d" is an integer, and is "4" in the exemplary embodiment shown in FIG. 3). Each of the cover sections 304a-304d are connected/hinged together by hinges 306a-306c, while hinge 306d hinges cover section 304d to the electronic device 302 and/or a back portion (not shown) of the cover 352.

Sensors (not shown in FIG. 3, but analogous to sensor(s) 154 shown in FIG. 1) are embedded within the hinges 306a-306d and/or the multiple cover sections 304a-304d. These sensors, which may be strain gauges, tactile sensors, accelerometers, and/or any other electronic device capable of detecting and generating a signal representative of movement of or against the cover sections 304a-304d, generate opening signals based on a user 1) opening one or more of the cover sections 304a-304d, and/or 2) touching, in a prescribed manner, a surface of one or more of the multiple cover sections 304a-304d.

For example, assume that cover section 304a is folded back (as in FIG. 2a), revealing area 308 on the display 310. This folding back of cover section 304a 1) uncovers area 308; 2) enables area 308; and 3) disables area 312, on the display 310, which was previously under cover sections 304b-304d. Note that even when cover 352 is completely rolled back from the display 310, only area 308 is enabled while area 312 continues to be disabled. However, if cover sections 304a and 304b had initially been unfurled, then area 308 would be larger than what is shown in FIG. 3. Thus, the system has several embodiments for determining which unfurled sections from cover sections 304a-304d are to be used as indicators of which part/area of display 310 is to be enabled/disabled.

In one embodiment, a user will indicate which cover section will be used to indicate which part/area of display 310 is to be enabled/disabled by touching the cover section (e.g., panel of the cover/case) in a prescribed manner. For example, the system may require that sensors within cover section 304a be touched by the user in a pattern as shown in line 314 in FIG. 3. Thereafter, when the user unfurls/unrolls the cover 352 away from the display 310, the area 308 will be associated with cover section 304a, and will thus be enabled, while the rest of the display 310 (i.e., disabled area 312) will be disabled.

In one embodiment, area 308 is defined by the area that cover section 304a covers. That is, any area on display 310 that is initially covered by cover section 304a will be enabled when the user unrolls cover section 304a away from the display 310.

In one embodiment, area 308 is defined by a percentage of cover 352 that cover section 304a makes up. For example, assume that cover section 304a makes up 25% of cover 352. Thus, by folding back cover section 304a from the display 310, 25% of the display 310 will be enabled while the remaining 75% of display is disabled. In one embodiment, the 25% of the display 310 that is enabled corresponds with the position of cover section 304a on the cover 352. That is, since the cover section 304a is at the bottom of the cover 352, then the bottom 25% of the display 352 is similarly enabled.

In one embodiment of the present invention, the mere touching of a particular cover panel defines 1) what percentage of the display is enabled/disabled, and/or 2) which area of the display is enabled/disabled. For example, assume that the user has touched cover section 304a in the prescribed manner (e.g., moving his/her finger in a counter-clockwise motion on the surface of cover section 304), which is detected by embedded sensors within cover section 304. Thereafter, area 308 is enabled while area 312 is disabled. In one embodiment, this enablement/disablement is immediate (i.e., while the cover 352 is still fully closed). In another embodiment, this enablement/disablement is effective as soon as some or all of the cover 352 is pulled back from the display 310.

Thus, consider now FIG. 4, which illustrates a display that is partially disabled according to a user's tactile input to the cover shown in FIG. 3. As depicted, a cover 452 (similar to cover 352 shown in FIG. 3) on an electronic device 402 (analogous to electronic device 302 shown in FIG. 3) has multiple cover sections 404a-404d (similar to cover sections 304a-304d shown in FIG. 3), which are connected to one another and/or cover 452 by hinges 406a-406d. Note that a user has touched cover panels 404b and 404c in a prescribed manner (as indicated by the counterclockwise motion shown by line 414). Thus, when the user unfolds the cover 452 away from the display 410, the corresponding middle area 408 of display 410 is enabled, while area 412a (corresponding to cover section 404a) and area 412d (corresponding to cover section 404d) are disabled. That is, the relative position of cover sections 404b-404c on cover 452 defines which area (area 408) of the display 410 is enabled.

Note that lines 314/414 are described above as being mere precursors to enabling certain areas of the respective displays 310/410. However, in one embodiment, the motion described by lines 314/414 defines which areas of the display are enabled/disabled no matter where they occur. For example, a finger movement in a circular motion against any area of cover 352/452 may enable a bottom half of the display 310/410, while a finger movement in a triangular motion against any area of cover 352/452 may enable a top half of the display 310/410.

Figure 5:
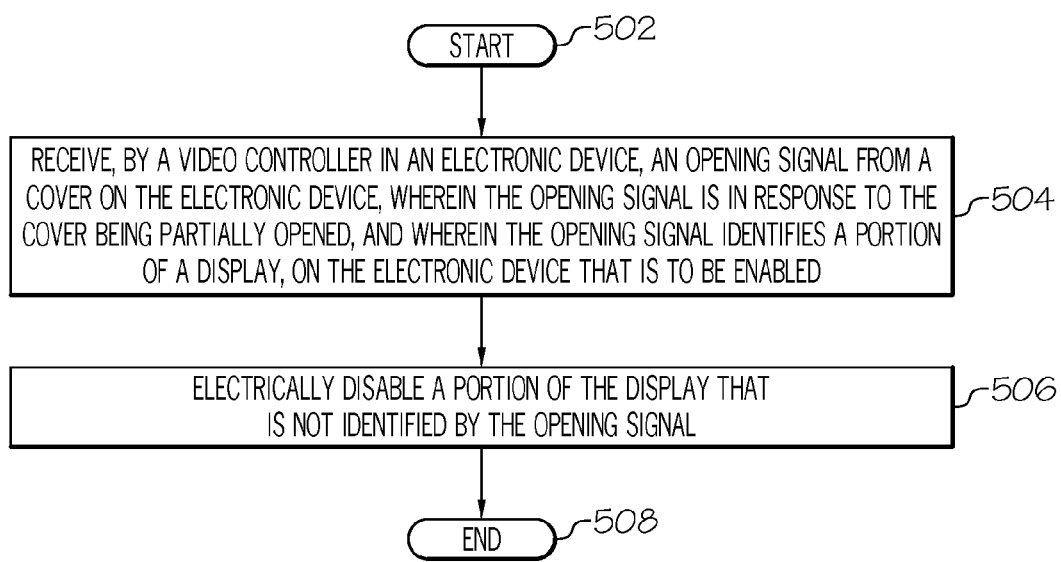
FIG. 5 is a high-level flowchart of one or more steps performed by one or more processors to control a displayed area on an electronic device's display.

With reference now to FIG. 5, a high-level flowchart of one or more steps performed by one or more processors to control a displayed area on an electronic device's display is presented. After initiator block 502, a video controller (e.g., video controller 108 in FIG. 1) in an electronic device (e.g., electronic devices 102/202/302/402 presented herein), receives an opening signal from a cover (e.g., covers 152/252/352/452 presented herein) on the electronic device, as described in block 504. The opening signal is in response to the cover being partially opened, and identifies and enables a first portion of a display on the electronic device. For example, the opening signal may be a user touching a certain section/area/panel on the cover, and/or the user folding back one or more sections/areas/panels of the cover away from the display.

As described in block 506 of FIG. 5, a second portion of the display, which is not identified by the opening signal, is then disabled, as described herein. The flow-chart of FIG. 5 ends at terminator block 508.

As described herein and in one embodiment of the present invention, an enabled first portion of the display is visible to a user, and a disabled second portion of the display is not visible to the user, as shown in FIGS. 3-4.

As described herein and in one embodiment of the present invention in which the display is a touch screen, an enabled first portion of the display is capable of receiving tactile inputs from a user, and a disabled second portion of the display is not capable of receiving tactile inputs from the user. For example, assume that a user of the electronic device has two windows open on the electronic device. One window contains financial records for the user's business, while another window displays a game that another person likes to play. By opening the cover in a manner described herein, the other person is able to play the game enabled window, but is unable to alter the financial records in the disabled window.

As described herein and in one embodiment of the present invention, the cover comprises multiple cover sections. The opening signal is generated in response to movement of one or more of the multiple cover sections, and the movement of one or more of the multiple cover sections progressively uncovers additional areas of the display to define an enabled first portion of the display. That is, as more and more of the panels/sections of the cover are rolled away from the display, a corresponding greater/larger area of the display is enabled.

As described herein and in one or more embodiments of the present invention, the cover comprises multiple cover sections. The opening signal is generated in response to a user touching, in a predefined motion, one or more of the multiple cover sections while the cover is closed, such that the user touching one or more of the multiple cover sections selectively defines an enabled first portion of the display.

In one embodiment of the present invention, assume that the electronic device is running a specific application, and that information from the specific application was previously displayed on an area of the display that included areas that are currently enabled and disabled. That is, the application was being displayed on most, if not all, of the display. In this embodiment, previously displayed information from the specific application is modified to fit on the first portion of the display that is currently enabled.

In one embodiment of the present invention, the modification to the specific application is performed by shrinking a size of the previously displayed information without removing any content. That is, assume that the application shown in FIG. 4 is a weather forecast application, and that this application originally took up all of the area on the display 410. If the user chooses to only use the middle portion of the display 410 (depicted as enabled area 408 in FIG. 4), in order to conserve power, etc., then the displayed information is merely made smaller, while retaining all of the original information.

In one embodiment of the present invention, the modification to the specific application is performed by altering the content of the previously displayed information. For example, assume that the application was the weather forecast application shown in FIG. 4, and that this application originally took up all of the area on the display 410. If the user chooses to only use the bottom (and small) portion of the display 310 (depicted as enabled area 308 in FIG. 3), in order to conserve power, etc., then the displayed information is truncated (i.e., content is removed), as shown in FIG. 3.

In one embodiment of the present invention, a cover for an electronic device includes at least one sensor (e.g., sensor(s) 154 shown in FIG. 1), which, as described herein, are able to detect cover sections being unfurled, a user touching cover sections in a prescribed manner, etc. Thus, in one embodiment the sensor(s) are able to detect that the cover is being partially opened. A signal transmitter (e.g., signal transmitter 158 shown in FIG. 1), which may merely be a conduit/pathway for signals from sensor(s) 154, within the cover transmits, to a video controller in the electronic device, an opening signal in response to the cover being partially opened. As described herein, the opening signal identifies and enables a first portion of a display on the electronic device (i.e., the signals from the sensor(s) 154 define which portions of the display are to be enabled). A disabling signal (which may be the same signal as the enabling signal—i.e., signals from sensors(s) 154 in FIG. 1) is sent to the video controller to electrically disable a second portion of the display that is not identified by the opening signal. That is, in one embodiment, a single signal from the sensor(s) 154 make up an enabling signal (to enable specific areas of the display) and a disabling signal (to disable other areas of the display).

In one embodiment of the present invention and as described herein, the display is a touch screen, such that an enabled first portion of the display is capable of receiving tactile inputs from a user, and a disabled second portion of the display is not capable of receiving tactile inputs from the user.

In one embodiment of the present invention and as described herein, the cover is made up of multiple cover sections, such that the opening signal is generated in response to a user touching, in a predefined motion, one or more of the multiple cover sections while the cover is closed. Thus, the user touching one or more of the multiple cover sections selectively defines an enabled first portion of the display.

As described herein, the present invention provides a new and useful improvement to controlling displays. The system and/or method described herein allows for fine granularity in controlling which areas of a display are enabled, thus 1) reducing power requirements of the electronic device, and/or 2) protecting (from observation and/or usage) various portions of the display. Furthermore, the present invention allows a user to selectively hide/disable a portion of a display, before and without exposing the display at all, thus providing better security for information on the display. That is, opening the cover, as described herein, both 1) identifies and 2) enables a particular area (portion) of a display, such that the particular area on the display is activated (visible; displayed) to the user. Areas/portions of the display that remain hidden by the electronic device's cover will be disabled (not visible, not displayed) to the user. Thus, the present invention provides a functionality to the display in which the display has multiple portions that are independently enabled and activated by the opening signal generated by opening the cover on the electronic device.

Note that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A method of controlling a displayed area on an electronic device's display, the method comprising:
    receiving, by a video controller in an electronic device, an opening signal from a cover on the electronic device, wherein the opening signal is in response to a portion of the cover being opened, and wherein the opening signal identifies and enables a first portion of a display on the electronic device; and
    disabling a second portion of the display that is not identified by the opening signal, wherein the display comprises multiple portions that are independently enabled and activated by the opening signal.

2. The method of claim 1, wherein the enabled first portion of the display is visible to a user, and wherein the disabled second portion of the display is not visible to the user.

3. The method of claim 1, wherein the display is a touch screen, wherein the enabled first portion of the display is capable of receiving tactile inputs from a user, and wherein the disabled second portion of the display is not capable of receiving tactile inputs from the user.

4. The method of claim 1, wherein the cover comprises multiple cover sections, wherein the opening signal is generated in response to movement of one or more of the multiple cover sections, and wherein the movement of one or more of the multiple cover sections progressively uncovers additional areas of the display to define the enabled first portion of the display.

5. The method of claim 1, wherein the cover comprises multiple cover sections, wherein the opening signal is generated in response to a user touching, in a predefined motion, one or more of the multiple cover sections while the cover is closed, and wherein the user touching one or more of the multiple cover sections selectively defines the enabled first portion of the display.

6. The method of claim 1, wherein the electronic device is running a specific application, wherein information from the specific application was previously displayed on an area of the display that included areas that are currently enabled and disabled, and wherein the method further comprises:
    modifying previously displayed information from the specific application to fit on the first portion of the display that is currently enabled.

7. The method of claim 6, further comprising:
    modifying the previously displayed information by shrinking a size of the previously displayed information without removing any content.

8. The method of claim 6, further comprising:
    modifying the previously displayed information by shrinking a size of the previously displayed information by removing content.

9. A computer program product for controlling a displayed area on an electronic device's display, the computer program product comprising a computer readable storage medium having program code embodied therewith, wherein the computer readable storage medium is not a transitory signal per se, and wherein the program code readable and executable by a processor to perform a method comprising:
    receiving, by a video controller in an electronic device, an opening signal from a cover on the electronic device, wherein the opening signal is in response to a portion of the cover being opened, and wherein the opening signal identifies and enables a first portion of a display on the electronic device; and
    disabling a second portion of the display that is not identified by the opening signal, wherein the display comprises multiple portions that are independently enabled and activated by the opening signal.

10. The computer program product of claim 9, wherein an enabled first portion of the display is visible to a user, and wherein a disabled second portion of the display is not visible to the user.

11. The computer program product of claim 9, wherein the display is a touch screen, wherein an enabled first portion of the display is capable of receiving tactile inputs from a user, and wherein a disabled second portion of the display is not capable of receiving tactile inputs from the user.

12. The computer program product of claim 9, wherein the cover comprises multiple cover sections, wherein the opening signal is generated in response to movement of one or more of the multiple cover sections, and wherein the movement of one or more of the multiple cover sections progressively uncovers additional areas of the display to define an enabled first portion of the display.

13. The computer program product of claim 9, wherein the cover comprises multiple cover sections, wherein the opening signal is generated in response to a user touching, in a predefined motion, one or more of the multiple cover sections while the cover is closed, and wherein the user touching one or more of the multiple cover sections selectively defines an enabled first portion of the display.

14. The computer program product of claim 9, wherein the electronic device is running a specific application, wherein information from the specific application was previously displayed on an area of the display that included areas that are currently enabled and disabled, and wherein the method further comprises:

modifying previously displayed information from the specific application to fit on the first portion of the display that is currently enabled.

15. The computer program product of claim 14, further comprising:

modifying the previously displayed information by shrinking a size of the previously displayed information without removing any content.

16. The computer program product of claim 14, further comprising:

modifying the previously displayed information by shrinking a size of the previously displayed information by removing content.

17. A cover for an electronic device, the cover comprising:

at least one sensor, wherein said at least one sensor detects the cover being partially opened; and a signal transmitter, wherein the signal transmitter:

transmits, to a video controller in the electronic device, an opening signal in response to the cover being partially opened, wherein the opening signal is in response to a portion of the cover being opened, and wherein the opening signal identifies and enables a first portion of a display on the electronic device; and transmits, to the video controller in the electronic device, a disabling signal to disable a second portion of the display that is not identified by the opening signal, wherein the display comprises multiple portions that are independently enabled and activated by the opening signal.

18. The cover of claim 17, wherein the display is a touch screen, wherein an enabled first portion of the display is capable of receiving tactile inputs from a user, and wherein a disabled second portion of the display is not capable of receiving tactile inputs from the user.

19. The cover of claim 17, further comprising:

multiple cover sections, wherein the opening signal is generated in response to a user touching, in a predefined motion, one or more of the multiple cover sections while the cover is closed, and wherein the user touching one or more of the multiple cover sections selectively defines an enabled first portion of the display.

\* \* \* \* \*